United States Patent
Wang et al.

(10) Patent No.: US 12,013,178 B2
(45) Date of Patent: Jun. 18, 2024

(54) HEATING DEVICE AND REFRIGERATOR

(71) Applicant: HAIER SMART HOME CO., LTD., Shandong (CN)

(72) Inventors: Haijuan Wang, Qingdao (CN); Peng Li, Qingdao (CN)

(73) Assignee: HAIER SMART HOME CO., LTD., Qingdao (CN)

( * ) Notice: Subject to any disclaimer, the term of this patent is extended or adjusted under 35 U.S.C. 154(b) by 413 days.

(21) Appl. No.: 17/424,732

(22) PCT Filed: Jan. 17, 2020

(86) PCT No.: PCT/CN2020/072798
§ 371 (c)(1),
(2) Date: Jul. 21, 2021

(87) PCT Pub. No.: WO2020/151596
PCT Pub. Date: Jul. 30, 2020

(65) Prior Publication Data
US 2022/0120496 A1 Apr. 21, 2022

(30) Foreign Application Priority Data
Jan. 23, 2019 (CN) .......................... 201910064962.6

(51) Int. Cl.
| F25D 31/00 | (2006.01) |
| F25D 23/02 | (2006.01) |
| F25D 23/12 | (2006.01) |

(52) U.S. Cl.
CPC .......... *F25D 31/005* (2013.01); *F25D 23/028* (2013.01); *F25D 23/12* (2013.01); *F25D 2400/02* (2013.01)

(58) Field of Classification Search
CPC ...... F25D 31/005; F25D 23/028; F25D 23/12; F25D 2400/02; H05B 6/64; H05B 6/72
See application file for complete search history.

(56) References Cited

U.S. PATENT DOCUMENTS 2,807,841 A * 10/1957 Janos .................... F25D 23/087
49/478.1
2010/0071874 A1* 3/2010 Nojima .................. F25D 17/065
165/61

(Continued)

FOREIGN PATENT DOCUMENTS

CN 2358364 Y 1/2000
CN 2670790 Y 1/2005

(Continued)

OTHER PUBLICATIONS

International Search Report for PCT/CN2020/072798 (ISA/CN) dated Mar. 24, 2020 (4 pages).

(Continued)

*Primary Examiner* — Marc E Norman
(74) *Attorney, Agent, or Firm* — Alston & Bird LLP (57) ABSTRACT

Provided are a heating device and a refrigerator. The heating device includes: a cylinder body, in which a heating cavity is defined and configured to place an object to be processed, provided with a pick-and-place opening located on a front side of the cylinder body; a door body, configured to open and close the pick-and-place opening of the cylinder body; an electromagnetic heating device, configured to generate electromagnetic waves into the heating cavity to heat the object to be processed; and magnetic elements, disposed on the door body or the cylinder body and configured to enable the door body and the cylinder body to attract each other, so that when the door body is in a closed state in which the door body seals the pick-and-place opening, the door body and the cylinder body are in close electrical contact, thereby forming a continuously conductive shielding body. By disposing the magnetic elements, on the one hand, the size of a gap between the door body and the cylinder body is reduced, and the amount of electromagnetic leakage is reduced; and on the other hand, it facilitates the door body (Continued)

and the cylinder body forming a continuously conductive shielding body to prevent electromagnetic waves from being emitted through the gap that may exist between the door body and the cylinder body, thereby effectively shielding the electromagnetic radiation and eliminating the harm of the electromagnetic radiation to the human body.

9 Claims, 6 Drawing Sheets

(56) References Cited

U.S. PATENT DOCUMENTS

| | | | | |
|---|---|---|---|---|
| 2015/0285552 | A1* | 10/2015 | Swaidan | F25D 23/12 62/155 |
| 2020/0318885 | A1* | 10/2020 | Jung | F25D 23/12 |
| 2021/0278112 | A1* | 9/2021 | Jeong | F25D 21/12 |
| 2021/0381755 | A1* | 12/2021 | Mori | F25D 31/005 |
| 2022/0079191 | A1* | 3/2022 | Wang | A23L 3/363 |
| 2022/0086973 | A1* | 3/2022 | Wang | F25D 23/12 |
| 2022/0099361 | A1* | 3/2022 | Wang | A23L 3/365 |

FOREIGN PATENT DOCUMENTS

| | | |
|---|---|---|
| CN | 2786512 Y | 6/2006 |
| CN | 103542436 A | 1/2014 |
| CN | 103604265 A | 2/2014 |
| CN | 108489187 A | 9/2018 |
| CN | 109000417 A | 12/2018 |
| CN | 109000419 A | 12/2018 |
| CN | 209893776 U | 1/2020 |
| EP | 3913309 A4 | 11/2021 |
| JP | H10112381 A | 4/1998 |
| JP | 2012-057464 A | 3/2012 |
| RU | 2258328 C1 | 8/2005 |
| TW | 490134 U | 6/2002 |

OTHER PUBLICATIONS

Supplementary European Search Report for EP Application No. 20744466.2 dated Feb. 8, 2022 (4 pagers).
Search Report for Russian Application No. 2021122579/10(047153) dated Dec. 23, 2021 (4 pages).
1$^{st}$ Office Action for Australia Application No. 2020211630 dated Jan. 23, 2019 (3 pages).
1$^{st}$ Office Action for EP Application No. 20744466.2 dated Feb. 21, 2022 (7 pages).
1$^{st}$ Office Action for Russian Application No. 2021122579/10 (047153) dated Dec. 24, 2021 (8 pages).
Search Report and 1$^{st}$ Office Action for China Patent Application No. 201910064962.6 dated Nov. 1, 2023 (16 pages).

\* cited by examiner

HEATING DEVICE AND REFRIGERATOR

CROSS-REFERENCE TO RELATED APPLICATIONS

The present application is a national phase entry of International Application No. PCT/CN2020/072798, filed Jan. 17, 2020, which claims priority to Chinese Patent Application No. 201910064962.6, filed Jan. 23, 2019, which are incorporated herein by reference in their entirety.

TECHNICAL FIELD

The present invention relates to the field of food heating, and particularly relates to a heating device and a refrigerator with the heating device.

BACKGROUND ART

In order to facilitate a user freezing and heating the food, in the prior art, the food is generally thawed by disposing a heating device or a microwave device in a refrigerator. Different heating modes have different thawing effects. The applicant of the present application previously applied for a thawing device with high thawing efficiency and uniform thawing and capable of ensuring food quality, and the thawing device uses electromagnetic waves to heat an object to be processed.

Generally, everyone thinks that electromagnetic waves are harmful to human health. Electromagnetic waves may produce radiation more or less. Especially nowadays, household appliances are increasing, and the electromagnetic pollution is getting more and more attention. If a human body is exposed to a strong electromagnetic field for a long time, the human body may be susceptible to cancer lesions. Therefore, anti-electromagnetic interference is a necessary and imperative work.

SUMMARY OF THE INVENTION

Generally, people do not know much about the shielding principle of electromagnetic waves and they think that as long as electrical appliances or tools use microwaves to achieve certain works, the electrical appliances or tools all have electromagnetic radiation and will cause harm to the human body. In fact, this concept is wrong. This is because there are only two factors that really affect the shielding effectiveness of a shielding body: one is that the whole surface of the shielding body must be continuously conductive, and the other is that there must be no conductor that directly penetrates through the shielding body. If there are many points without conductive continuity on the shielding body, non-conductive gaps will be formed at the junctions of different parts of the shielding body. These non-conductive gaps will cause electromagnetic leakage, just as fluid leaks from gaps on a container.

Therefore, an objective of the first aspect of the present invention is to overcome at least one of the defects in the prior art and provide a heating device capable of effectively reducing or even avoiding electromagnetic leakage.

A further objective of the first aspect of the present invention is to further avoid electromagnetic leakage of the heating device.

Another further objective of the first aspect of the present invention is to further improve the safety of the heating device in use.

According to the first aspect of the present invention, the present invention provides a heating device, including:
a container body, in which a heating cavity is defined and configured to place an object to be processed, provided with an opening located on a front side of the container body;
a door body, configured to open and close the opening of the container body;
an electromagnetic heating device, configured to generate electromagnetic waves into the heating cavity to heat the object to be processed in the heating cavity; and
magnetic elements, disposed on the door body or the container body and configured to enable the door body and the container body to attract each other, so that when the door body is in a closed state in which the door body seals the opening, the door body and the container body are in close electrical contact, thereby forming a continuously conductive shielding body.

Optionally, the door body is provided with a metal end plate configured to be electrically connected with the container body to close the heating cavity, and the magnetic elements are disposed on one side of the metal end plate deviating from the container body.

Optionally, the door body further includes conductive connectors protruding from the metal end plate to a direction close to the container body and electrically connected with the metal end plate, and the conductive connectors are configured to be in electrical contact with the container body when the door body is in a closed state, so as to electrically connect the metal end plate and the container body through the conductive connectors.

Optionally, the conductive connectors are metal bumps or conductive adhesive strips protruding backward from a rear wall of the metal end plate.

Optionally, front side positions of the metal end plate corresponding to the conductive connectors in a front and rear direction form backward recessed pits, and the magnetic elements are accommodated in the pits.

Optionally, the door body further includes a front end cover and a rear end plate disposed front and rear, and the metal end plate is located between the front end cover and the rear end plate; and
the rear end plate is provided with first through holes, and the conductive connectors protrude backward from the first through holes so as to be electrically connected with the container body when the door body is in a closed state.

Optionally, a rear side of the front end cover is provided with installation grooves, and the magnetic elements are installed in the installation grooves in a clamping mode.

Optionally, the conductive connectors are conductive elastic sheets integrally formed with the metal end plate or fixedly connected with the metal end plate, and the conductive elastic sheets are configured to be in electrical contact with a front surface of the container body when the door body is in a closed state.

Optionally, the heating device further includes:
a sliding rail assembly, including a fixed rail disposed inside the container body and electrically connected with the container body, and a sliding rail operably sliding along the fixed rail and in electrical contact with the fixed rail, wherein
the conductive connectors are conductive elastic sheets integrally formed with the metal end plate or fixedly connected with the metal end plate, one end of each of the conductive elastic sheets is electrically connected with the metal end plate, and the other end of each of the conductive elastic sheets is electrically connected with the fixed rail or the sliding rail at least when the door body is in a closed state, thereby forming an electrical connection with the container body.

According to the second aspect of the present invention, the present invention provides a refrigerator, including:
- a cabinet, in which at least one storage compartment is defined; and
- any one of the above-mentioned heating devices, disposed in one of the storage compartments.

The heating device of the present invention uses an electromagnetic heating device to heat the object to be processed, which is high in heating efficiency and uniform in heating and can ensure the food quality. The heating device is provided with the container body and the door body which are independent of each other. When the door body is closed, a certain gap will inevitably be formed at the combined position of the container body and the door body, and this gap is the main reason that the heating device cannot form a continuously conductive shielding body and thus causes electromagnetic leakage. Therefore, in the present invention, by specially designing the magnetic elements on the door body or the container body, the door body and the container body are attracted to each other, so that the door body and the container body are in close electrical contact when the door body is in a closed state. On the one hand, the size of the gap between the door body and the container body is reduced, and the amount of electromagnetic leakage is reduced; and on the other hand, it can facilitate the door body and the container body forming a continuously conductive shielding body to prevent electromagnetic waves from being emitted through the gap that may exist between the door body and the container body, thereby effectively shielding the electromagnetic radiation and eliminating the harm of the electromagnetic radiation to the human body.

Further, in the present invention, the conductive connectors are also specially designed. Even if there is still a gap between the container body and the door body, an electrical connection may still be formed between the container body and the door body, so as to form a continuously conductive shielding body during heating to further prevent electromagnetic waves from being emitted through this gap, thereby effectively shielding the electromagnetic radiation and eliminating the harm of the electromagnetic radiation to the human body.

Further, the door body of the present invention also includes a front end cover and a rear end plate, and the metal end plate having electrical conductivity is located between the front end cover and the rear end plate. Therefore, a user will not touch the conductive metal end plate when operating the door body, which further improves the safety of the heating device in use.

According to the following detailed descriptions of specific embodiments of the present invention in conjunction with the drawings, those skilled in the art will more clearly understand the above and other objectives, advantages and features of the present invention.

BRIEF DESCRIPTION OF THE DRAWINGS

Some specific embodiments of the present invention are described in detail below with reference to the drawings by way of example and not limitation. The same reference numerals in the drawings indicate the same or similar components or parts. Those skilled in the art should understand that these drawings are not necessarily drawn in scale. In figures.

DETAILED DESCRIPTION OF THE INVENTION

Firstly, the present invention provides a heating device configured to heat and thaw an object to be processed. The heating device may be used alone or may be used together with a refrigerator or other devices.

Figure 1:
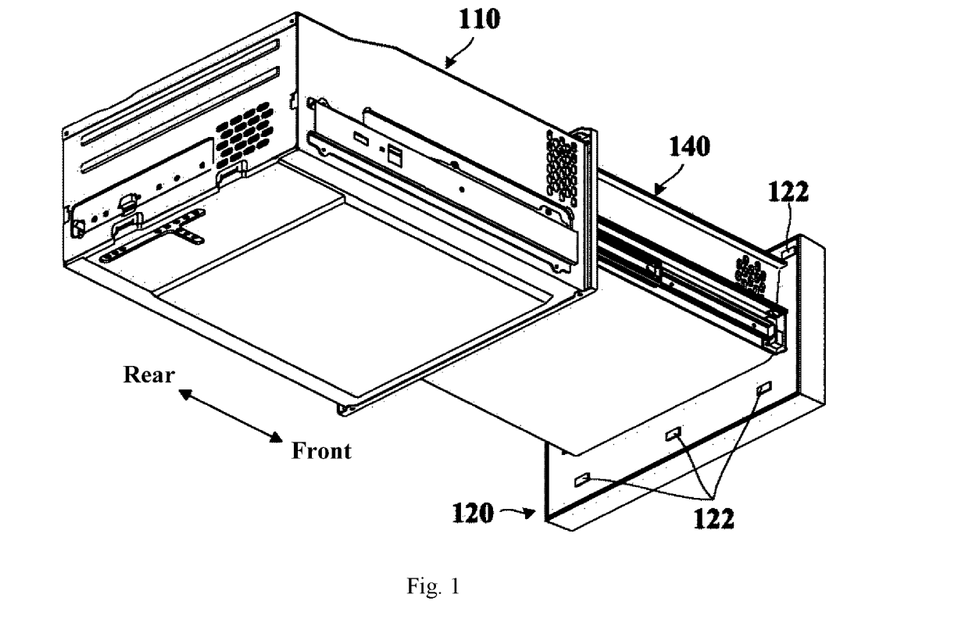
FIG. 1 is a schematic partial structural exploded view of a heating device according to one embodiment of the present invention.

FIG. 1 is a schematic partial structural exploded view of a heating device according to one embodiment of the present invention. Referring to FIG. 1, a heating device 10 of the present invention includes a container body 110, a door body 120 and an electromagnetic heating device (not shown in FIG. 1). A heating cavity configured to place an object to be processed is defined in the container body 110, and the container body is provided with an opening located on the front side thereof. The door body 120 is configured to open and close the opening of the container body 110. Specifically, when the door body 120 seals the opening of the container body 110, the door body is in a closed state; and when the door body 120 opens the opening of the container body 110, the door body is in an open state. The door body 120 may be installed together with the container body 110 in an appropriate mode (such as buckling and pulling).

The electromagnetic heating device is configured to generate electromagnetic waves into the heating cavity to heat the object to be processed in the heating cavity. At least a part of the electromagnetic heating device is disposed in the container body 110. The electromagnetic waves generated by the electromagnetic heating device may be radio frequency waves, microwaves and other electromagnetic waves having a suitable wavelength. Such a mode of heating the object to be processed by electromagnetic waves is high in heating efficiency and uniform in heating, and can ensure the food quality.

Figure 2:
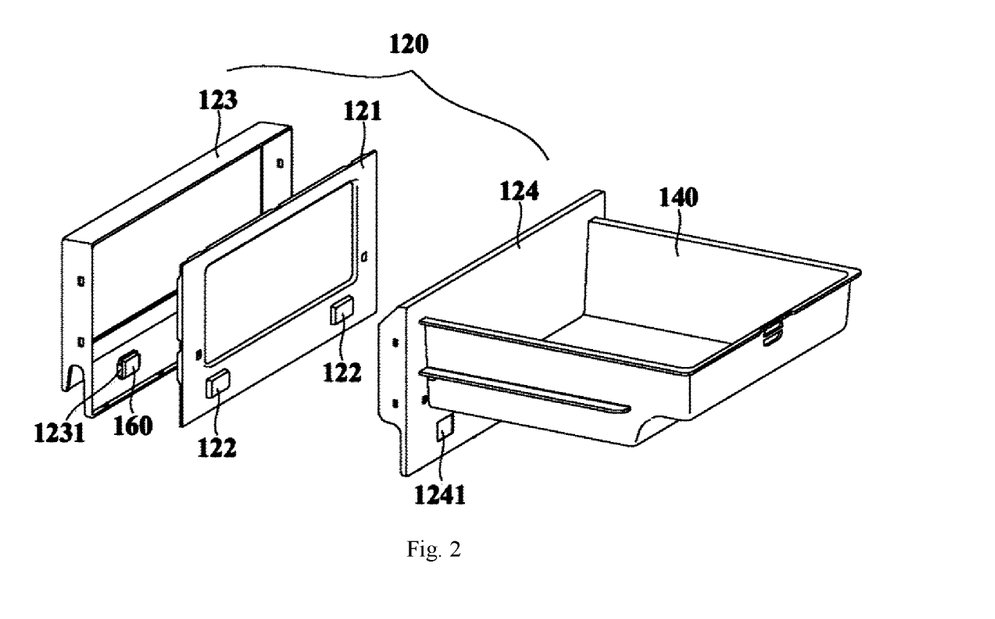
FIG. 2 is a schematic exploded view of a door body according to one embodiment of the present invention.

FIG. 2 is a schematic exploded view of a door body according to one embodiment of the present invention. For ease of understanding, FIG. 2 also shows a drawer connected with the door body. Specifically, the heating device 10 further includes magnetic elements 160, and the magnetic elements 160 are disposed on the door body 120 or the container body 110 and configured to enable the door body 120 and the container body 110 to attract each other, so that when the door body 120 is in a closed state in which the door body seals the opening of the container body 110, the door body 120 and the container body 110 are in close electrical contact, thereby forming a continuously conductive shielding body.

In the present invention, by specially designing the magnetic elements 160 on the door body 120 or the container body 110, the door body 120 and the container body 110 are attracted to each other, so that the door body 120 and the container body 110 are in close electrical contact when the door body 120 is in a closed state. On the one hand, the size of the gap between the door body 120 and the container body 110 is reduced, and the amount of electromagnetic leakage is reduced; and on the other hand, it facilitates the door body 120 and the container body 110 forming a continuously conductive shielding body to prevent electromagnetic waves from being emitted through the gap that may exist between the door body 120 and the container body 110, thereby effectively shielding the electromagnetic radiation and eliminating the harm of the electromagnetic radiation to the human body.

In some embodiments, the door body 120 is provided with a metal end plate 121 configured to be electrically connected with the container body 110 to close the heating cavity in the container body 110. When the door body 120 is in a closed state, the metal end plate 121 of the door body 120 seals the opening of the container body 110, thereby sealing the heating cavity in the container body 110. The container body 110 may be a metal container body, and alternatively may be a non-metal container body on which electromagnetic shielding features such as conductive coatings, conductive metal meshes, etc., are provided.

Further, the magnetic elements 160 may be disposed on one side of the metal end plate 121 deviating from the container body 110, thereby ensuring the stability of installation of the magnetic elements 160, and ensuring that the door body 120 and the container body 110 are closely attracted by the magnetic elements 160.

In some embodiments, the door body 120 further includes conductive connectors 122 protruding from the metal end plate 121 to the direction close to the container body 110 (that is, backward) and electrically connected with the metal end plate 121, and the conductive connectors 122 are configured to be in electrical contact with the container body 110 when the door body 120 is in a closed state, so as to electrically connect the metal end plate 121 and the container body 110 through the conductive connectors 122.

In the present invention, by specially designing the conductive connectors 122 on the door body 120, even if a gap still exists between the container body 110 and the door body 120 when the door body 120 is in a closed state, it still can be ensured that an electrical connection is formed between the container body 110 and the door body 120, so as to form a continuously conductive shielding body during heating, thereby further preventing the electromagnetic waves from being emitted through the gap, effectively shielding the electromagnetic radiation, and eliminating the harm of the electromagnetic radiation to the human body.

Further, the present invention only needs the conductive connectors 122 protruding and extending from the metal end plate 121 of the door body 120 to the direction close to the container body 110, and has no need of completely disposing a conductive material in the entire gap between the door body 120 and the container body 110. On the one hand, a gap is prevented from being formed again between the filled conductive material and the door body or the container body; and on the other hand, a lot of materials and some manufacturing processes are saved, the structure of the heating device 10 is simplified, and the cost of the heating device is reduced.

In some embodiments, the conductive connectors 122 are metal bumps or conductive adhesive strips protruding backward from the rear wall of the metal end plate 121. Specifically, the conductive connectors 122 may be metal bumps integrally formed with the metal end plate 121, and the metal bumps protrude and extend from the rear surface of the metal end plate 121 to the direction close to the container body 110 (that is, backward). In some other embodiments, the conductive connectors 122 may be metal bumps fixedly connected with the metal end plate 121, and the metal bumps may be fixed on the surface (that is, the rear surface) of the metal end plate 121 facing the container body 110 by suitable modes, such as screw connection, welding and riveting. In some other embodiments, the conductive connectors 122 may be conductive adhesive strips fixed on the metal end plate 121 by conductive adhesives. In these embodiments, the shapes of the metal bumps or the conductive adhesive strips are not limited and may be a strip shape, a square shape, a circular shape or other suitable shapes.

The conductive connectors 122 of the present invention may directly use metal bumps, conductive adhesive strips, etc., and are in direct electrical contact with the outer end surface of the container body 110 located at the peripheral edge of the opening and facing the door body 120, thereby omitting other complicated connecting structures, supporting structures or assembly structures, further simplifying the structure of the heating device 10, and reducing the cost of the heating device.

Figure 3:
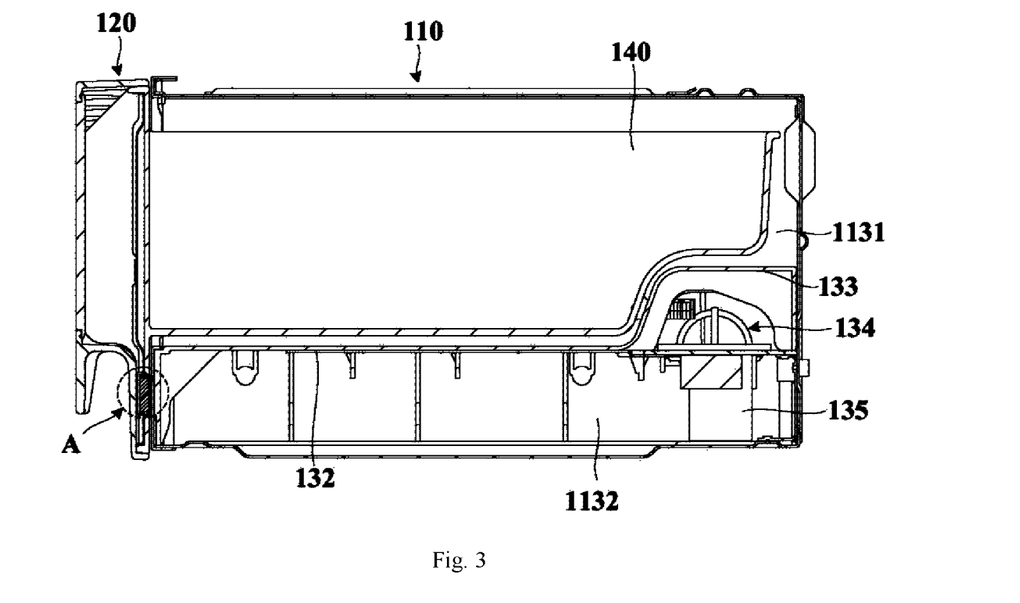
FIG. 3 is a schematic sectional view of a heating device according to one embodiment of the present invention.
Figure 4:
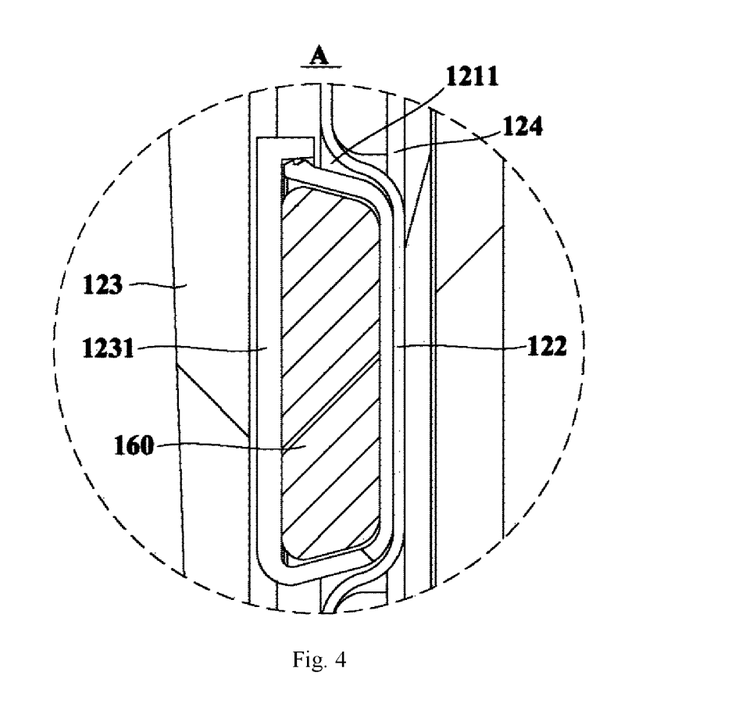
FIG. 4 is a schematic enlarged view of a part A in FIG. 3.

FIG. 3 is a schematic sectional view of a heating device according to one embodiment of the present invention. FIG. 4 is a schematic enlarged view of a part A in FIG. 3. In some embodiments, the front side positions of the metal end plate 121 corresponding to the conductive connectors 122 in a front and rear direction form backward recessed pits 1211, and the magnetic elements 160 are accommodated in the pits 1211. In other words, in these embodiments, the magnetic elements 160 may attract the container body 110 with the conductive connectors 122 therebetween.

Further, the door body 120 further includes a front end cover 123 and a rear end plate 124 disposed front and rear, and the end plate 121 is located between the front end cover 123 and the rear end plate 124. Therefore, a user will not touch the conductive end plate 121 when operating the door body 120, which further improves the safety of the heating device 10 in use.

Specifically, in some embodiments, the front end cover 123 and the rear end plate 124 may be tightly connected by means of engaging and/or screw connection, etc., and the end plate 121 is clamped between the front end cover 123 and the rear end plate 124. The end plate 121 may have a connection relationship with the front end cover 123 or the rear end plate 124 (such as engaging, screw connection or other suitable connection relationships), or may not have a connection relationship with the front end cover or the rear end plate, and may obtain a stable support only by the clamping force of the front end cover 123 and the rear end plate 124. In some other embodiments, the front end cover 123 and the end plate 121 may be pre-assembled together in a suitable mode first. For example, the front end cover 123 made of a plastic material may be molded by injection on the front side of the end plate 121, and then, the front end cover 123 molded by injection on the front side of the end plate 121 is assembled with the rear end plate 124. In some embodiments, the heating device 10 further includes a drawer 140 for carrying an object to be processed, and the drawer 140 is connected to the rear side of the door body 120 and is disposed in the container body 110 in a push-and-pull manner through the opening. The rear end plate 124 and the drawer 140 are integrally formed or fixedly connected.

Further, the rear end plate 124 is provided with first through holes 1241, and the conductive connectors 122 protrude backward from the first through holes 1241 so as to allow the conductive connectors 122 to be in electrical contact with the container body 110 when the door body 120 is in a closed state. The shapes of the first through holes 1241 may be consistent with the shapes of the conductive connectors 122 to improve the aesthetic appearance of the door body 120.

In some embodiments, the rear side of the front end cover 123 is provided with installation grooves 1231, and the magnetic elements 160 are installed in the installation grooves 1231 in a clamping mode. After the front end cover 123, the metal end plate 121 and the rear end plate 124 are assembled together, the magnetic elements 160 clamped in the installation grooves 1231 are accommodated in the pits 1211.

Figure 5:
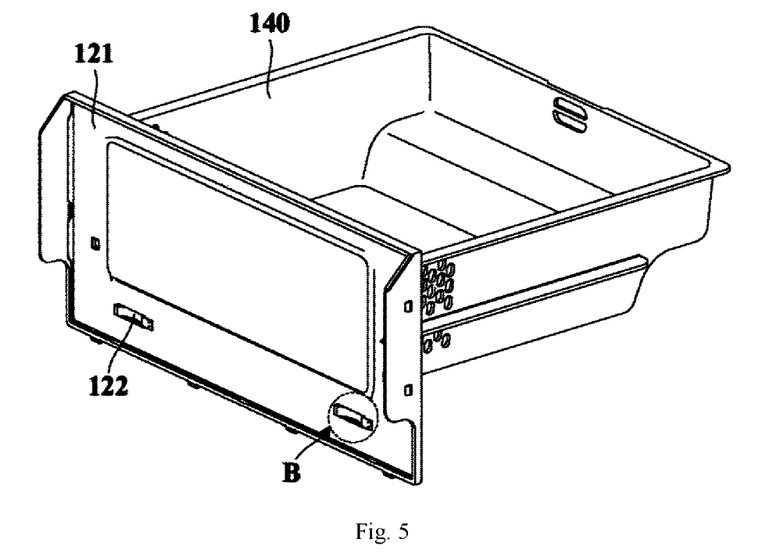
FIG. 5 is a schematic structural view of a door body and a drawer according to another embodiment of the present invention.
Figure 6:
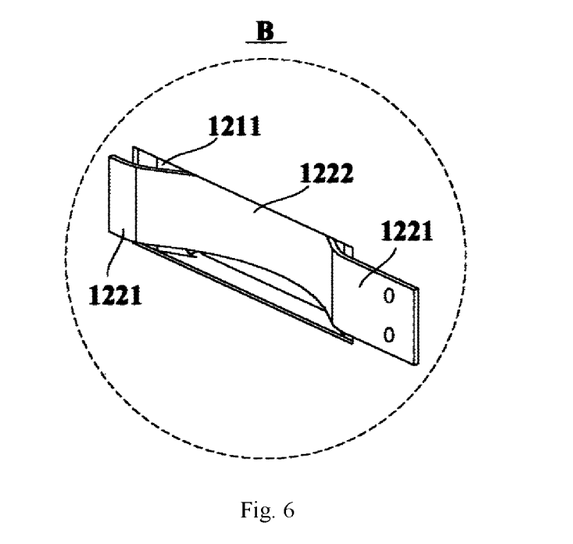
FIG. 6 is a schematic enlarged view of a part B in FIG. 5.

FIG. 5 is a schematic structural view of a door body and a drawer according to another embodiment of the present invention. FIG. 6 is a schematic enlarged view of a part B in FIG. 5. In some embodiments, the conductive connectors 122 are conductive elastic sheets integrally formed with the metal end plate 121 or fixedly connected with the metal end plate 121, and the conductive elastic sheets are configured to be in electrical contact with the front surface of the container body 110 when the door body 120 is in a closed state. Specifically, the conductive elastic sheets and the metal end plate 121 are integrally formed. At this time, the conductive elastic sheets may be metal elastic sheets made of the same material as the metal end plate 121. In some other embodiments, the conductive elastic sheets may be fixed on the metal end plate 121 by means of screw connection, welding or riveting.

Specifically, each of the conductive elastic sheets may include at least one straight end section 1221 and an arch section 1222 protruding and arching from the end section 1221 to the direction facing the container body 110. Specifically, in the embodiments shown in FIG. 5 and FIG. 6, each of the conductive elastic sheets includes two end sections 1221, and the arch section 1222 is disposed between the two end sections 1221.

Further, at least one of the end sections 1221 is tightly connected with the metal end plate 121 by screws, and the arch section 1222 is configured to be in electrical contact with the front surface of the container body 110 when the door body 120 is in a closed state, so as to electrically connect the metal end plate 121 and the container body 110 through the conductive elastic sheets, thereby further simplifying the structure of the heating device 10, and reducing the cost of the heating device.

The metal end plate 121 may be provided with second through holes 1212, each of the conductive elastic sheets has two end sections 1221, and the arch section 1222 of each of the conductive elastic sheets is located between the two end sections 1221. The two end sections 1221 of each of the conductive elastic sheets 122 are both located on the front side of the metal end plate 121 deviating from the container body 110, and the arch section 1222 of each of the conductive elastic sheets protrudes backward through a second through hole 1211. Such a structural relationship and a connection relationship between the conductive elastic sheets and the metal end plate 121 may enable the electrical connection between the conductive elastic sheets and the metal end plate to be more reliable, and the installation of the conductive elastic sheets to be more stable.

Figure 7:
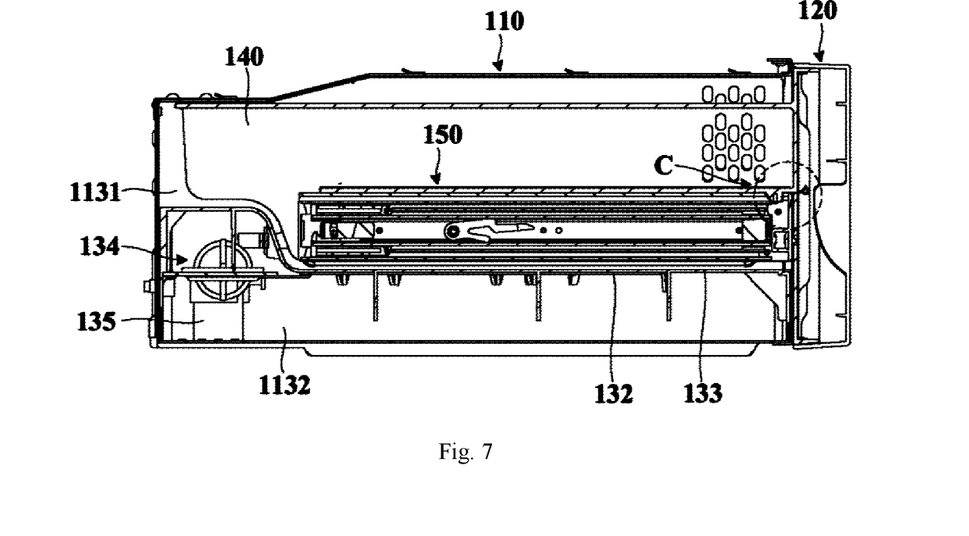
FIG. 7 is a schematic sectional view of a heating device according to yet another embodiment of the present invention.
Figure 8:
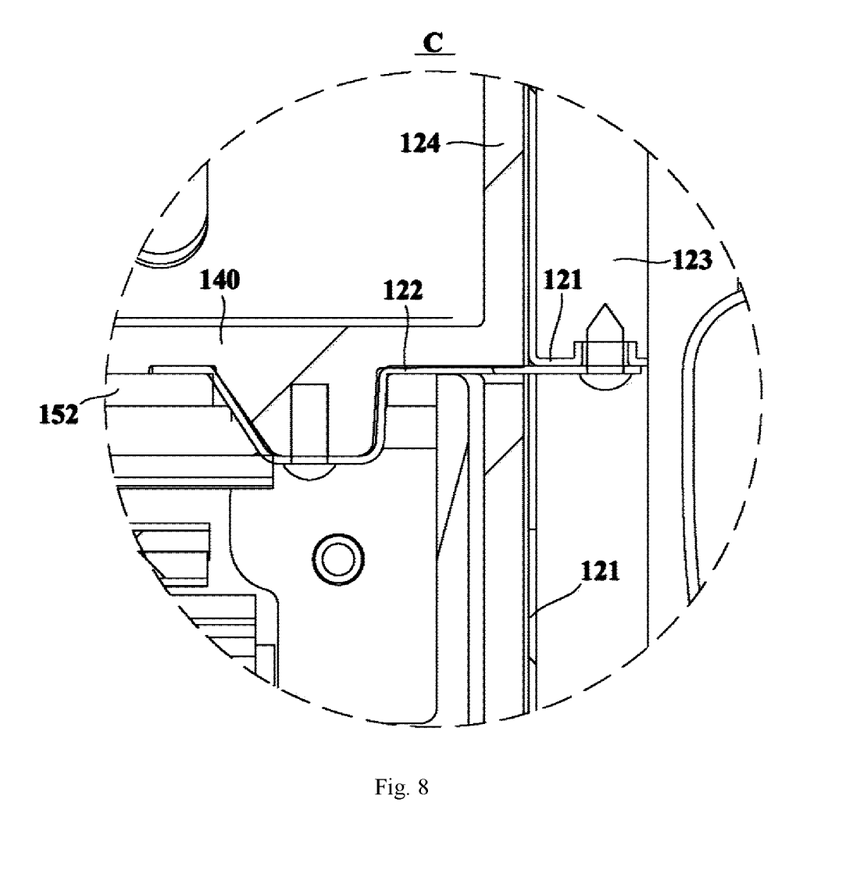
FIG. 8 is a schematic enlarged view of a part C in FIG. 7.

FIG. 7 is a schematic sectional view of a heating device according to yet another embodiment of the present invention. FIG. 8 is a schematic enlarged view of a part C in FIG. 7. In some embodiments, the heating device 10 further includes a sliding rail assembly 150, and the sliding rail assembly 150 includes a fixed rail 151 disposed inside the container body 110 and electrically connected with the container body 110, and a sliding rail 152 operably sliding along the fixed rail 151 and in electrical contact with the fixed rail 151. The door body 120 may be slidably connected with the container body 110 along the front-and-rear direction by the sliding rail assembly. In these embodiments, the conductive connectors 122 may be conductive elastic sheets integrally formed with the metal end plate 121 or fixedly connected with the metal end plate 121, one end of each of the conductive elastic sheets is electrically connected with the metal end plate 121, and the other end of each of the conductive elastic sheets is electrically connected with the fixed rail 151 or the sliding rail 152 at least when the door body 120 is in a closed state, thereby forming an electrical connection with the container body 110.

Further, the sliding rail 152 may be disposed outside the drawer 140, and the other end of each of the conductive elastic sheets is electrically connected with the sliding rail 152 so as to be electrically connected with the container body 110 by the sliding rail 152 and the fixed rail 151. Therefore, no matter what state the door body 120 is in, the conductive elastic sheets 122 will maintain a stable and reliable electrical connection with the container body 110 by the sliding rail 152 and the fixed rail 151, thereby improving the reliability of electromagnetic shielding of the heating device 10 and the safety of the heating device 10 in use.

Figure 9:
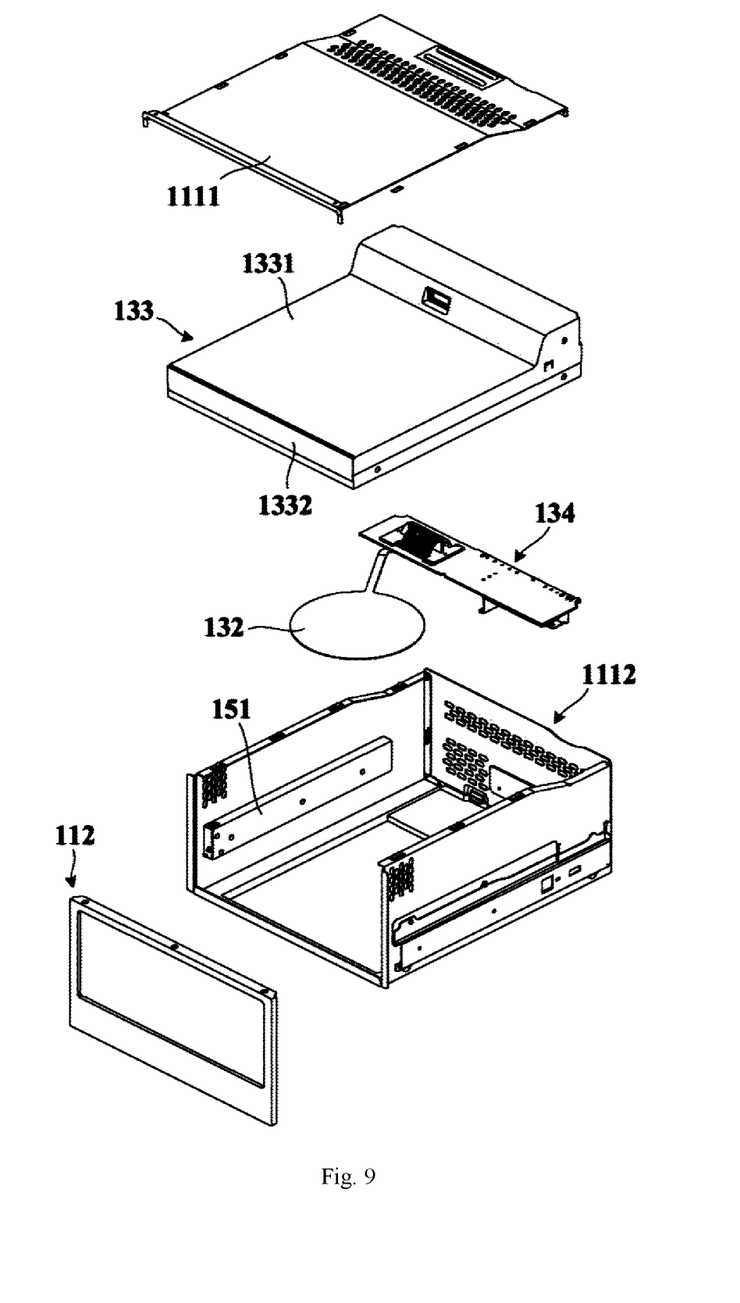
FIG. 9 is a schematic structural exploded view of a container body and a part of electromagnetic thawing device according to one embodiment of the present invention.

FIG. 9 is a schematic structural exploded view of a container body and a part of electromagnetic thawing device according to one embodiment of the present invention. In some embodiments of the present invention, the container body 110 may include a metal body and a metal decoration 112 attached to the front side of the metal body. The metal decoration 112, for example, may be a sheet metal part, which is in electrostatic contact with the metal body. The front surface of the metal decoration 112 forms a front surface of the container body 110. The metal body may include a metal lower cover 1112 and a metal upper cover 1111 covering the metal lower cover 1112, and the metal lower cover 1112 has two lateral side plates, a bottom plate and a rear plate.

In some embodiments of the present invention, the electromagnetic heating device includes an electromagnetic generating module 131 (referring to FIG. 10), a radiating antenna 132 and an antenna housing 133. The electromagnetic generating module 131 is configured to generate electromagnetic wave signals. The radiating antenna 132 is electrically connected with the electromagnetic generating module 131 to generate electromagnetic waves of corresponding frequencies in the heating cavity according to the electromagnetic wave signals generated by the electromagnetic generating module 131, so as to heat the object to be processed in the heating cavity. The antenna housing 133 is made of an insulating material and is disposed in the container body 110 and configured to separate the heating cavity inside the container body 110 into a heating chamber 1131 and an electrical appliance chamber 1132, wherein the object to be processed and the radiating antenna 132 are respectively disposed in the heating chamber 1131 and the electrical appliance chamber 1132 to separate the object to be processed from the radiating antenna 132, thereby preventing the radiating antenna 132 from being exposed after the drawer 140 is pulled out to affect the use experience of a user, and meanwhile avoiding the radiating antenna 132 from being dirty or damaged by accidental touch. The electromagnetic generating module 131 may be disposed outside the container body 110.

Further, the antenna housing 133 may be made of a non-transparent material to reduce the electromagnetic loss of electromagnetic waves at the antenna housing 133, thereby increasing the heating rate of the object to be processed.

Further, the antenna housing 133 may be disposed at the bottom inside the container body 110 and includes a clapboard 1331 extending horizontally and a skirt part 1332 extending downward from the peripheral edge of the clapboard 1331. The skirt part 1332 may be fixedly connected with the container body 110. The radiating antenna 132 may be fixed on the lower side of the clapboard 1331 by engaging or other suitable modes. Alternatively, the radiating antenna 132 may be used as a liquid metal material to be directly electroplated on the clapboard 1331.

In some embodiments, the electromagnetic heating device further includes a signal processing and measurement and control circuit 134, and the signal processing and measurement and control circuit 134 is electrically connected with the electromagnetic generating module 131 and is configured to detect and adjust the specific features of the electromagnetic waves generated by the electromagnetic generating module 131. The radiating antenna 132 may be connected to a circuit board of the signal processing and measurement and control circuit 134. Specifically, the signal processing and measurement and control circuit 134 may be disposed in the electrical appliance chamber 1132 and located on the rear side of the radiating antenna 132. The signal processing and measurement and control circuit 134 may be supported in the electrical appliance chamber 1132 by a support frame 135.

Figure 10:
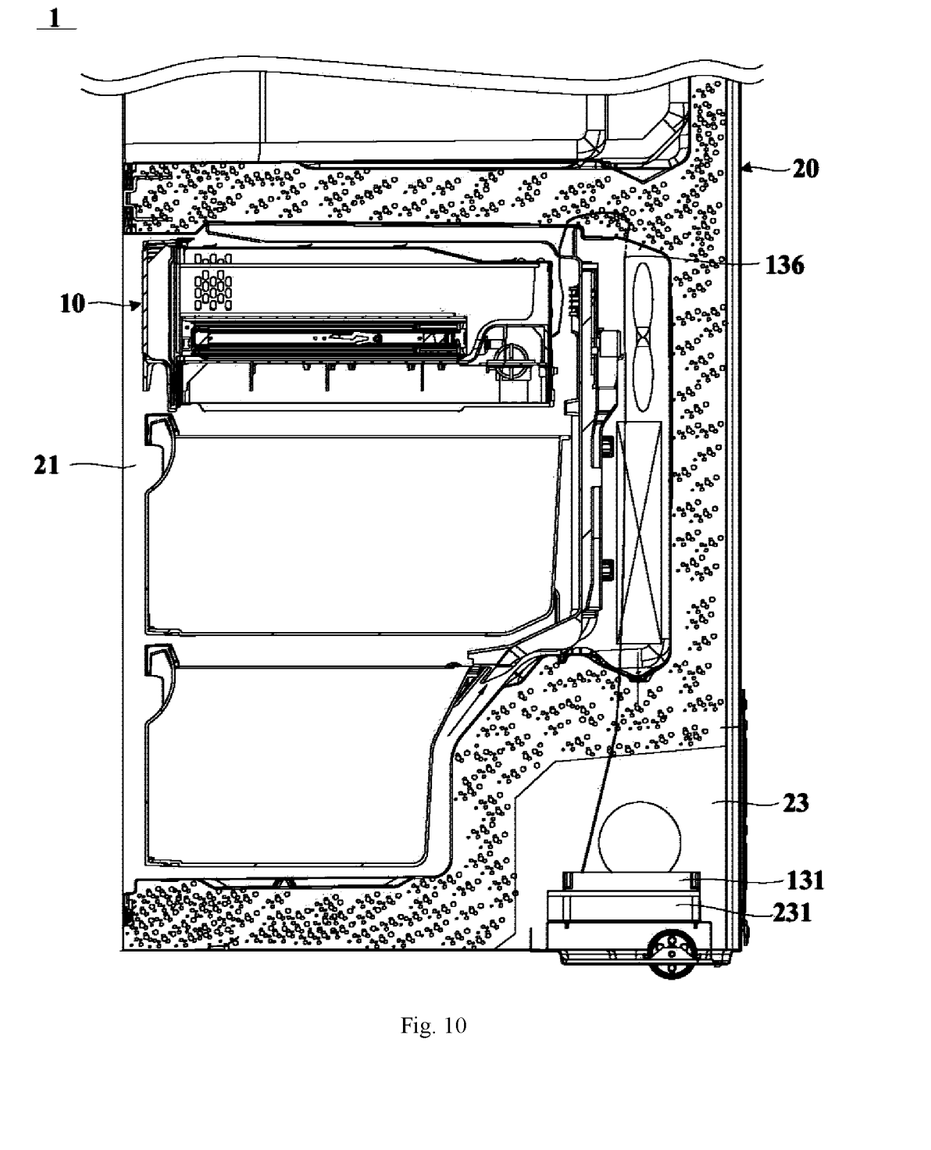
FIG. 10 is a schematic structural view of a refrigerator according to one embodiment of the present invention.

Based on the heating device 10 according to any one of the above-mentioned embodiments, the present invention further provides a refrigerator. FIG. 10 is a schematic structural view of a refrigerator according to one embodiment of the present invention. Referring to FIG. 10, the refrigerator 1 of the present invention includes a cabinet 20, and at least one storage compartment 21 is defined in the cabinet 20. The refrigerator 1 further includes compartment door bodies configured to respectively open and close the opening of each storage compartment, a refrigerating system, and the like.

Specifically, the refrigerator 1 further includes the heating device 10 described in any one of the above-mentioned embodiments, which is disposed in one of the storage compartments 21. The object to be processed, taken out from a freezing chamber of the refrigerator, may be heated by the heating device 10, so that the heating effect is good, and the use is convenient.

In some embodiments, a compressor bin 23 configured to place a compressor is also defined in the cabinet 20. The compressor bin 23 is usually located at the bottom of the rear side of the cabinet 20 and is defined by a shell of the cabinet 20 and a bottom steel assembly. The electromagnetic generating module 131 may be disposed in the compressor bin 23 and is connected with the signal processing and measurement and control circuit 134 by a cable 136, and then is electrically connected with the radiating antenna 132 by the signal processing and measurement and control circuit 134.

Further, a bracket 231 is also disposed in the compressor bin 23, and the electromagnetic generating module 131 is supported on the bracket 231.

Those skilled in the art should understand that unless otherwise specified, the terms "top", "bottom", "inner", "outer", "lateral", "front", "rear", etc. used to represent the orientation or position relationship in the embodiments of the present invention are based on the actual use state of the heating device 10 and the refrigerator 1. These terms are only for facilitating the description and understanding of the technical solutions of the present invention, rather than indicating or implying that the device or component referred to must have a specific orientation, and therefore can not be understood as limiting the present invention.

Hereto, those skilled in the art should realize that although multiple exemplary embodiments of the present invention have been shown and described in detail herein, without departing from the spirit and scope of the present invention, many other variations or modifications that conform to the principles of the present invention may still be directly determined or deduced from the contents disclosed in the present invention. Therefore, the scope of the present invention should be understood and recognized as covering all these other variations or modifications.

The invention claimed is:

1. A heating device, comprising:
    a container body, in which a heating cavity is defined and configured to place an object to be processed, provided with an opening located on a front side of the container body;
    a door body, configured to open and close the opening of the container body;
    an electromagnetic heating device, configured to generate electromagnetic waves into the heating cavity to heat the object to be processed in the heating cavity; and
    magnetic elements, disposed on the door body or the container body and configured to enable the door body and the container body to attract each other, so that when the door body is in a closed state in which the door body seals the opening, the door body and the container body are in close electrical contact, thereby forming a continuously conductive shielding body,
    wherein the door body is provided with a metal end plate configured to be electrically connected with the container body to close the heating cavity, and the magnetic elements are disposed on one side of the metal end plate away from the container body.

2. The heating device according to claim 1, wherein
    the door body further comprises conductive connectors protruding from the metal end plate to a direction close to the container body and electrically connected with the metal end plate, and the conductive connectors are configured to be in electrical contact with the container body when the door body is in g closed state, so as to electrically connect the metal end plate and the container body through the conductive connectors.

3. The heating device according to claim 2, wherein
    the conductive connectors are metal bumps or conductive adhesive strips protruding backward from a rear wall of the metal end plate.

4. The heating device according to claim 3, wherein
    front side positions of the metal end plate corresponding to the conductive connectors in a front and rear direction form backward recessed pits, and the magnetic elements are accommodated in the pits.

5. The heating device according to claim 4, wherein
the door body further comprises a front end cover and a rear end plate disposed front and rear, and the metal end plate is located between the front end cover and the rear end plate; and
the rear end plate is provided with first through holes, and the conductive connectors protrude backward from the first through holes so as to be electrically connected with the container body when the door body is in the closed state.

6. The heating device according to claim 5, wherein
a rear side of the front end cover is provided with installation grooves, and the magnetic elements are installed in the installation grooves in a clamping mode.

7. The heating device according to claim 2, wherein
the conductive connectors are conductive elastic sheets integrally formed with the metal end plate or fixedly connected with the metal end plate, and the conductive elastic sheets are configured to be in electrical contact with a front surface of the container body when the door body is in the closed state.

8. The heating device according to claim 2, further comprising:
a sliding rail assembly, including a fixed rail disposed inside the container body and electrically connected with the container body and a sliding rail operably sliding along the fixed rail and in electrical contact with the fixed rail, wherein
the conductive connectors are conductive elastic sheets integrally formed with the metal end plate or fixedly connected with the metal end plate, one end of each of the conductive elastic sheets is electrically connected with the metal end plate, and the other end of each of the conductive elastic sheets is electrically connected with the fixed rail or the sliding rail at least when the door body is in the closed state, thereby forming an electrical connection with the container body.

9. A refrigerator, comprising:
a cabinet, in which at least one storage compartment is defined; and
a heating device according to claim 1, disposed in one of the at least one storage compartment.

* * * * *

UNITED STATES PATENT AND TRADEMARK OFFICE
CERTIFICATE OF CORRECTION

PATENT NO. : 12,013,178 B2  
APPLICATION NO. : 17/424732  
DATED : June 18, 2024  
INVENTOR(S) : Haijuan Wang et al.

Page 1 of 1

It is certified that error appears in the above-identified patent and that said Letters Patent is hereby corrected as shown below:

In the Claims

In Column 10, Line 56, Claim 2, delete "in g" and insert -- in the --, therefor.

In Column 12, Line 5, Claim 8, delete "body" and insert -- body, --, therefor.

Signed and Sealed this  
Tenth Day of September, 2024

Katherine Kelly Vidal  
*Director of the United States Patent and Trademark Office*